United States Patent [19]
Ohtuka et al.

[11] 4,212,366
[45] Jul. 15, 1980

[54] POWER STEERING CONTROL DEVICE

[75] Inventors: Tadao Ohtuka, Namekawa; Takeshi Ohe, Higashimatsuyama; Kunihiro Hamano, Tokigawa, all of Japan

[73] Assignee: Jidosha Kiki Co., Ltd., Tokyo, Japan

[21] Appl. No.: 941,075

[22] Filed: Sep. 11, 1978

[51] Int. Cl.² ............................................. B62D 5/08
[52] U.S. Cl. .................................................... 180/141
[58] Field of Search ...................... 180/141, 142, 143; 91/375 A

[56] References Cited

U.S. PATENT DOCUMENTS

| 3,171,298 | 3/1965 | Biabaud | 180/143 |
|---|---|---|---|
| 3,744,515 | 7/1973 | Inoue | 180/143 |
| 3,877,540 | 4/1975 | Masuda | 180/143 |
| 3,901,343 | 8/1975 | Inoue | 180/142 |
| 4,000,785 | 1/1977 | Nishikawa | 180/143 |
| 4,119,172 | 10/1978 | Yanagishima | 180/142 |

FOREIGN PATENT DOCUMENTS 2401950 7/1974 Fed. Rep. of Germany ........... 180/141

Primary Examiner—John J. Love
Assistant Examiner—Randall A. Schrecengost
Attorney, Agent, or Firm—Blanchard, Flynn, Thiel, Boutell & Tanis

[57] ABSTRACT

A power steering control device which is provided with a sensing means which detects the weight of a load carried on the vehicle and a pressure control valve which regulates the pressure of the hydraulic fluid that is supplied to the power steering in response to the value of the detected load, thereby lightening the operation of the steering wheel when the load on the vehicle is large. The pressure control valve can be regulated also by the output of a vehicle speed sensing means. With the controlling factors of both the vehicle load and the vehicle speed, the operation of the steering wheel is lightened when the vehicle speed is low and the vehicle load is large, whereas the operation of the steering wheel meets with a proper resistance when the vehicle speed is high and the vehicle load is small, thereby stabilizing the operation of the steering wheel and giving an ideal feeling to the driver to operate the steering wheel.

19 Claims, 21 Drawing Figures

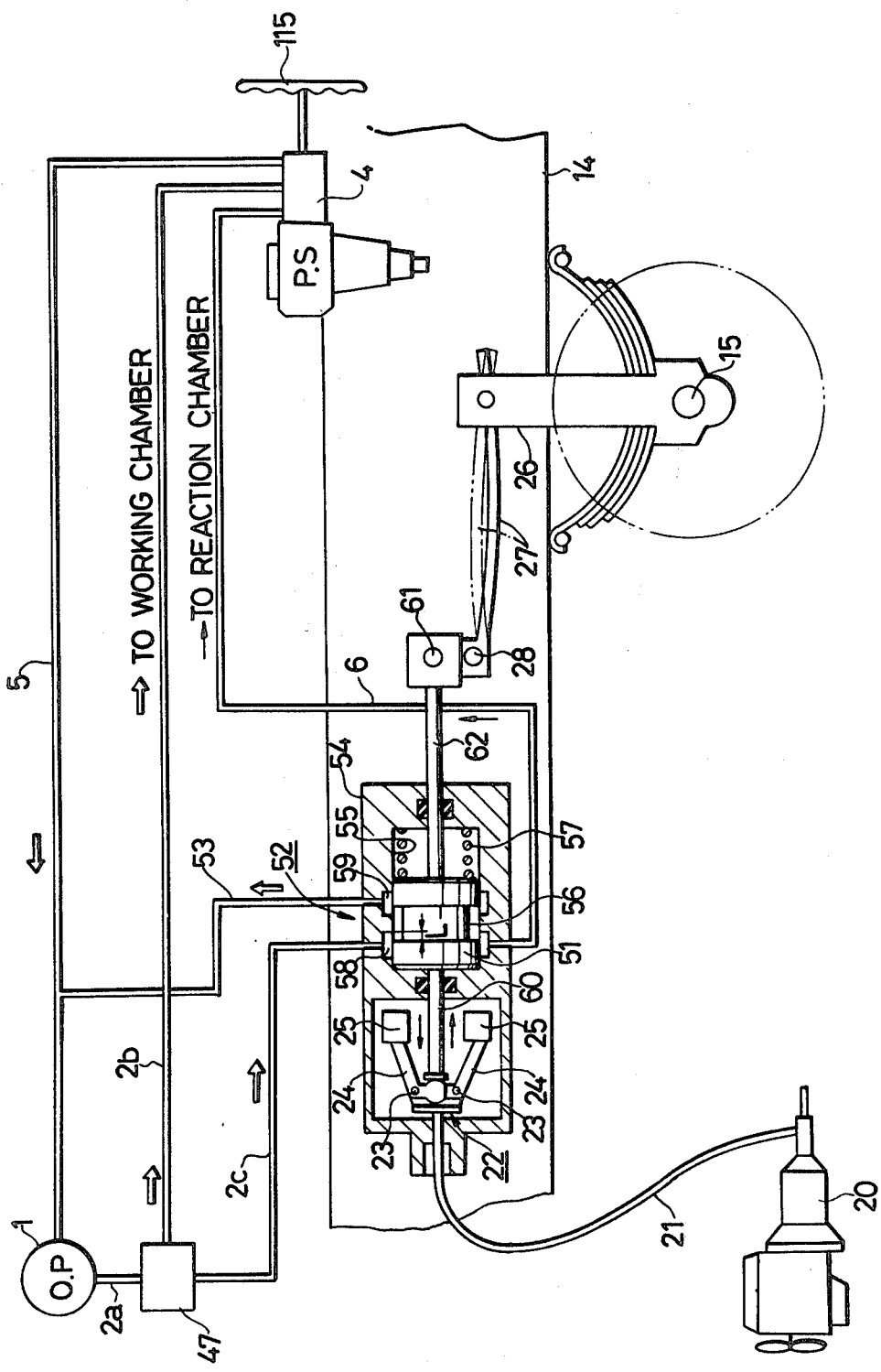

POWER STEERING CONTROL DEVICE

BACKGROUND OF THE INVENTION

This invention relates to a power steering control device. More particularly, the invention relates to a novel steering power control device which varies the steering power in response to the combined factors of the weight of a load that is carried on the vehicle and the speed of the vehicle.

Power steering gives an auxiliary force to the turning effort of a steering wheel and it facilitates the operation of the steering wheel. There are known several kinds of power steering systems such as an integral type, a semi-integral type and a linkage type. The linkage type power steering systems are further divided into two kinds, that is, a combined type power steering in which a power cylinder and a control valve are integrally formed and the other type is a separate type power steering system in which the above two elements are formed separately. In order to give the feeling of steering resistance to the driver, any one of these conventional power steering systems is inevitably provided with a reaction force mechanism which transmits a reaction force to a steering wheel in response to the intensity of a steering output. With respect to the manners to of applying reaction forces to steering wheels, the power steering systems are classified as follows: In a first type power steering system, the intensity of the reaction force to the steering wheel is determined in response to the pressure in a working chamber which generates the steering output, that is, in response to the ratio of auxiliary force of the steering power. In a second type power steering system, a reaction force chamber to give resistance to the operation of the steering wheel is formed in addition to the working chamber, thereby the reaction force applied to a steering wheel is determined by the level of the pressure in the reaction force chamber. The other third type power steering system is a combined type of the former two types, in which the reaction force applied to the steering wheel is generated in response to the ratio of an auxiliary force and to the reaction force of a reaction force chamber. In any of the above three type power steering systems, when the working pressure caused by the power steering is large, the resistance in the operation of a steering wheel becomes relatively large.

In recent years, in order to secure safety in high speed running, various kinds of pressure or flow control means have been proposed so as to enlarge the reaction force which is applied to the steering wheel with the increase of vehicle speed even under the same ratio of steering output (ratio of auxiliary force). In any of such improvements in power steering systems, however, the speed of a vehicle is detected so as to control the reaction force applied to the steering wheel in response to the vehicle speed and any factor other than the vehicle speed is not taken into consideration.

The weight of a load of a motor truck is largely varied between a loaded state and an unloaded state. In such a motor truck, when the elements are set so as to obtain a proper steering output and a reaction force of the steering wheel in a loaded state, the operation of the steering wheel in an unloaded state becomes too light and the stability in vehicle running is not maintained, especially in high speed running. To the contrary, if the elements are set to an unloaded state, the resistance in the operation of a steering wheel becomes too large in a loaded state.

BRIEF SUMMARY OF THE INVENTION

In order to realize the ideal drivability of a motor vehicle which is equipped with power steering, especially of a motor truck the load of which generally varies to a large extent, the inventors of the present invention have denied the ordinary consideration that gives too much importance to vehicle speeds and they have turned their attention to control the output of the power steering by the weight of a load that is carried on the vehicle.

It is, therefore, the object of the present invention to provide a power steering control device which reduces the required force to operate a steering wheel when the weight of a load is large.

Another object of the present invention is to control the fluid pressure in response to the weight of a load, which fluid pressure is both the source of working pressures of the power steering and the source of reaction forces applied to the steering wheel.

Further, the object of the present invention will be described with regard to the respective types of power steering systems. In the type which is provided with a reaction force chamber to exert a reaction force to the steering wheel, the pressure of the reaction force chamber is reduced when the load weight is large so as to reduce the resistance in the operation of the steering wheel. In a power steering system which is provided with only a working chamber, the pressure of a fluid which is led into the working chamber is increased when the weight of the load is large. Further, in the power steering system of the type in which the pressures of both a working chamber and a reaction force chamber are utilized to cause the reaction force to the steering wheel, the pressure of the working chamber is raised and the pressure of the reaction force chamber is reduced when the weight of the load is large, so as to raise the the ratio of the auxiliary force relative to the steering power, thereby reducing the resistance in the operation of the steering wheel.

Furthermore, the object of the present invention is to provide a power steering control device which reduces the reaction force applied to the steering wheel when the weight of a load is large and the vehicle speed is low, while the reaction force applied to the steering wheel is increased when the weight of the load is small and the vehicle speed is high. This object is attained by adding the conventional steering control factor in response to the vehicle speed, to the above-described steering control system in response to the weight of the load.

Accordingly, another object of the present invention is to attain such an effect that the operation of the steering wheel is properly heavy and stable in an unloaded state at high speed running, while the operation of the steering wheel is light in a loaded state at low speed running.

BRIEF DESCRIPTION OF THE DRAWINGS

These and other objects and features of the present invention will become more apparent to those skilled in the art from the following description taken in connection with the accompanying drawings, in which:

FIG. 11 is a partially cross-sectional connection drawing of another embodiment of the present invention, wherein a pressure control valve of a spool valve type is employed;

DETAILED DESCRIPTION OF THE INVENTION

Referring now to the accompanying drawings, the present invention will be described in more detail.

Figure 1:
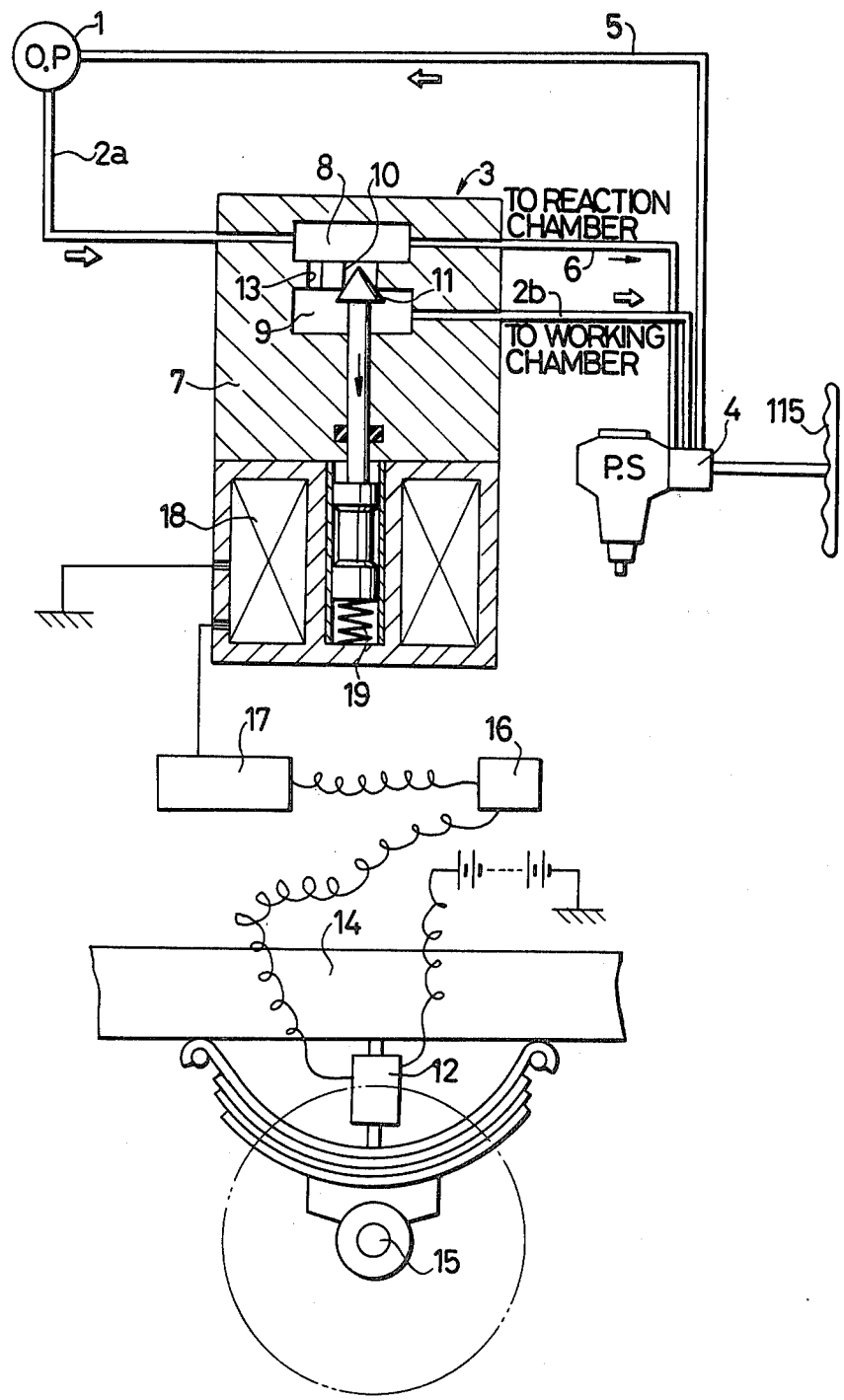
FIG. 1 is a partially cross-sectional connection drawing of an embodiment of a power steering control device according to the present invention, wherein a pressure control valve is regulated by electrically detecting the weight of a load.

FIG. 1 shows a steering power control device of the present invention for use in a power steering system, which device is capable of regulating the steering power in response to the weight of a load carried on a vehicle. An oil pump 1 is driven by the vehicle engine. The hydraulic oil is delivered from the oil pump 1 to a power steering unit 4 by way of a line 2a, a pressure control valve 3 and another line 2b. The hydraulic oil is then returned to the oil pump 2 through a line 5. This power steering 4 has a working chamber which generates a steering output and a reaction force chamber which gives a reaction force to the steering wheel. The above-mentioned line 2b is connected to the working chamber and the line 6 from the pressure control valve 3 is connected to the reaction force chamber.

Figure 2:
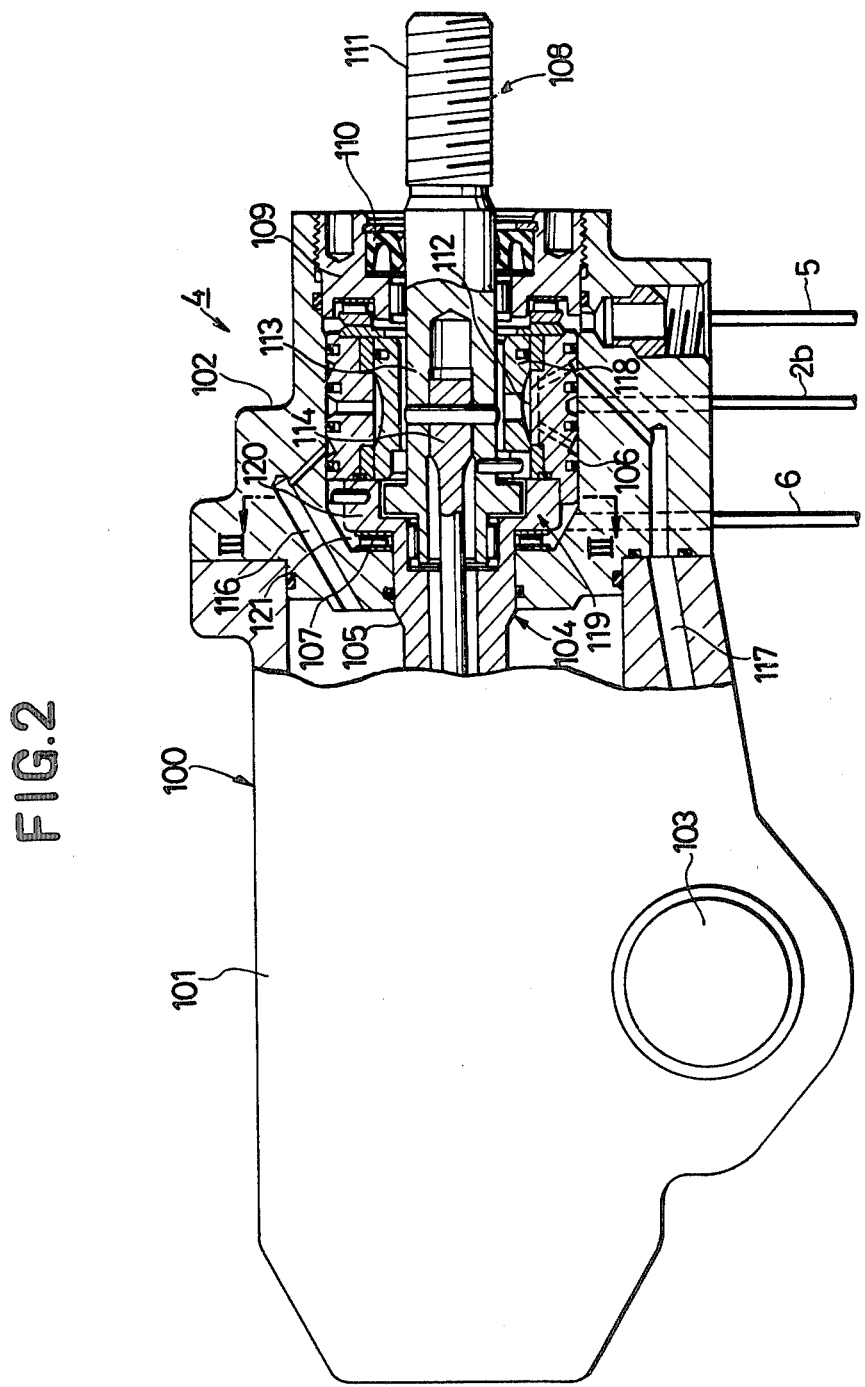
FIG. 2 is a cross-sectional view of a power steering device which is provided with a working chamber to generate steering power and a reaction force chamber to exert reaction force to the steering wheel.
Figure 3:
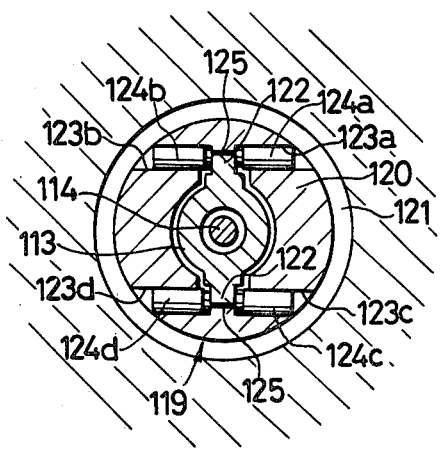
FIG. 3 is a transverse cross-sectional view of the same taken on the line III—III in FIG. 2.

In accordance with FIGS. 2 and 3, an example of well known power steering unit 4 will be described. This power steering unit 4 is provided with a reaction force chamber to exert reaction forces to the steering wheel as well as working chambers to produce steering powers.

The housing 100 of the power steering unit 4 is composed of a casing 101 of a working section which forms a hydraulic motor and a casing 102 for a control valve. The latter casing 102 is connected to the rear end opening of the former casing 101 to close up the opening. In the casing 101 of the working section, a cylinder and a double-acting piston (not shown) which engages with the cylinder are installed. A rack is formed in the under part of this piston and the pinion gear of an output shaft 103 is brought into engagement with the rack. This output shaft 103 is connected to the vehicle wheels by way of a pitman arm, drag link, knuckle arm and so forth (not shown).

The output member 104 of this power steering unit 4 is composed of a screw shaft 105 and a valve body 106. The screw shaft 105 is fitted into the axial bore of the piston with interposing a large number of balls which are held in the ball screw threads formed in the axial bore of the piston. The valve body 106 is connected to the rear end of the screw shaft 105 and closely and rotatably fitted into the control valve casing 102. The above screw shaft 105 is rotatably supported in the bore of the control valve casing 102 by means of a thrust bearing 107. The input member 108 is composed of an operation shaft 111 and a hollow shaft 113. The operation shaft 111 is supported by a rear lid plate 109 of the control valve casing 102 with interposing a sealing member 110. The hollow shaft 113 is extended from this operation shaft 111 and led into the valve chamber 112 of the valve body 106. Further, the hollow shaft 113 is connected to the screw shaft 105 by means of a flexible shaft 114 which is inserted into the hollow shaft 113 and this hollow shaft 113 is rotatable relative to the screw shaft 105. The outer end of the operation shaft 111 is driven by the steering wheel 115 that is shown in FIG. 1. The foregoing line 2b is communicated with one of the annular grooves that are formed in the peripheral portion of the valve body 106. The inner passages 116 and 117 that are defined in the housing 100, are communicated with other annular grooves formed around the valve body 106, at the same time, they are respectively communicated with the front and rear working chambers which are separated by the piston in the working section casing 101. The line 5 is communicated with a low pressure passage which is formed between the above valve body 106 and the lid plate 109 and it returns the low pressure fluid from the valve chamber 112 in the valve body 106 into the oil pump 1. The valve body 106 functions as a well known rotary control valve by cooperating with the inner valve body 118 that is formed around the hollow shaft 113. By the relative rotations of these members, the line 2b is communicated with one of the front and rear working chambers by way of one of the inner passages 116 and 117. While, the other working chamber is connected to the line 5 by way of the other of the inner passages 116 and 117, thereby distributing the hydraulic fluid and operating the hydraulic motor.

The reaction force mechanism 119 includes a cylindrical portion 120 which is formed in the end portion of the above-mentioned screw shaft 105 and a cooperating portion which is formed on the hollow shaft 113 that is inserted through this cylindrical portion 120. The structure of the mechanism is such that a reaction force chamber 121 is formed in the peripheral portion of the cylindrical portion 120 and the above-mentioned line 6 is communicated with the reaction force chamber 121. Protruding portions 122 are formed on the diametrically opposed outsides of the hollow shaft 113. As shown in FIG. 3, the cylindrical portion 120 is provided with plunger holes 123a–123d. The inside ends of the holes 123a–123d are directed to the protruding portions 122 and the outer ends thereof are opened to the reaction force chamber 121. Further, the respective plunger holes receive slidably therein plungers 124a–124d. In order to form the bottoms of the pairs of opposed plunger holes 123a, 123b, and 123c, 123d, the cylindrical portion 120 is provided with shoulders 125 which are disposed in conformity with the protruding portions 122. When the plungers 124a–124d are urged inward by the hydraulic pressure applied to the reaction force chamber 121, the inside ends of the plungers are brought into contact with the side faces of the shoulders 125, at the same time, they come into contact with the protruded portions 122 in a neutral position.

In the power steering unit 4 having the above-described structure, when the steering wheel 115 is turned, for example, to the right, the flexible shaft 114 is twisted relative to the screw shaft 105 of the output member 104. The valve body 106 that is connected to the screw shaft 105 and the inner valve body 118 formed on the hollow shaft 113 are turned relative to each other, thereby functioning as an ordinary rotary control valve. Thus, as described above, the hydraulic fluid is distributed and, by means of the inner passages 116 and 117, one of the working chambers of the hydraulic motor is connected to the line 2b on the side of the pump and the other working chamber is connected to the line 5 on the side of a reservoir. Thus, the hydraulic motor is driven and steering output is transmitted to the output shaft 103. At the same time, the protruded portions 122 of the hollow shaft 113 are turned right and plungers 124a and 124d which are in contact with them, are shifted outward from the positions of the engagement with the shoulders 125 against the fluid pressure in the reaction force chamber 121. The hydraulic pressures applied to these plungers 124a and 124d are transmitted to the steering wheel 115 as a steering resistance by way of each protruded portion 122, hollow shaft 113 and operation shaft 111. Therefore, when a fluid pressure in response to the weight of a load is introduced into the reaction force chamber 121, the steering resistance is applied to the steering wheel in response to the weight of the load, which will be further described in the following.

Returning to FIG. 1, the housing 7 of the pressure control valve 3 is provided with a chamber 8 which communicates with the lines 2a and 6 and another chamber 9 which communicates with the line 2b. The communicating area of an orifice 10 which is formed between both the chambers 8 and 9 is varied by the position of a poppet valve 11, thereby controlling the fluid pressures in the lines 2b and 6, that is, the fluid pressures applied to the working chamber and the reaction force chamber of the power steering 4. The position of the poppet valve 11 is determined in response to the output of a vehicle load sensor 12. The reference numeral 13 denotes another orifice which ensures the supply of hydraulic oil from the oil pump 2 to the power steering 4 even when the poppet valve 11 closes the orifice 10.

The vehicle load sensor 12 is installed in the space between a chassis frame 14 and a wheel axle 15 or a member which is integrally formed with the axle 15. The weight of a vehicle load is detected by the variation of the distance between the chassis frame 14 and the wheel axle 15. The output of the load sensor 12 in response to the weight of a load is transmitted to a solenoid 18 by way of a filter 16 and a controller 17. When the weight of a load is large, the poppet valve 11 is attracted in the direction of the arrow in FIG. 1 by the solenoid 18 against the force of a spring 19, thereby increasing the communicating area of the orifice 10. The filter 16 prevents the poppet valve 11 from fluctuation by eliminating the high frequency components in the output of the vehicle load weight sensor 12 during the travelling of a vehicle on a curved road or rugged road.

In the device of the present invention having the above described structure, the position of the poppet valve 11 is varied in response to the weight of a vehicle load so that the communicating area of the orifice 10 is varied. In order to obtain a proper steering power at an unloaded state, several factors such as the position of the poppet valve 11 and the diameter of the orifice 10 are firstly determined. In an unloaded state, the communicating area of the orifice 10 is made minimum by the poppet valve 11 and the communication between the chamber 8 and 9 is also made minimum. In other words, the hydraulic pressure of the chamber 8, that is, the line 6 to the reaction force chamber of the power steering 4, is raised. Accordingly, when the steering wheel is operated in the unloaded state, the largest reaction force is exerted to the steering wheel because the pressure in the chamber 8 and the pressure in the working chamber of the power steering 4 that is raised by the operation resistance, act as the reaction forces to the steering wheel. In the present invention, taking the above facts into consideration, several factors are previously determined in an unloaded state so as to obtain a proper steering power.

In a loaded state, the vehicle load weight sensor 12 produces an output in response to the weight of a load. This output is transmitted to the solenoid 18 through the controller 17 so that the poppet valve 11 is attracted downward (in the drawing). The communicating area of the orifice 10 is thus enlarged as compared with the unloaded state and the pressure in the chamber 8 is reduced because the narrowing action to the passage between the chambers 8 and 9 is reduced. Meanwhile, the pressure in the chamber 9 is raised as compared with the unloaded state. Accordingly, the hydraulic pressure in the line 2b which is connected to the working chamber of the power steering 4 is raised, at the same time, the pressure in the line 6 that is communicated with the reaction force chamber is reduced. Therefore, the output of the power steering 4 becomes large, thereby reducing the operation resistance of the steering wheel. That is, in the loaded state, it is possible to turn a steering wheel by a smaller force or the same force as compared with the unloaded state since the steering power output of the power steering 4 becomes large in response to the weight of the load.

Figure 4:
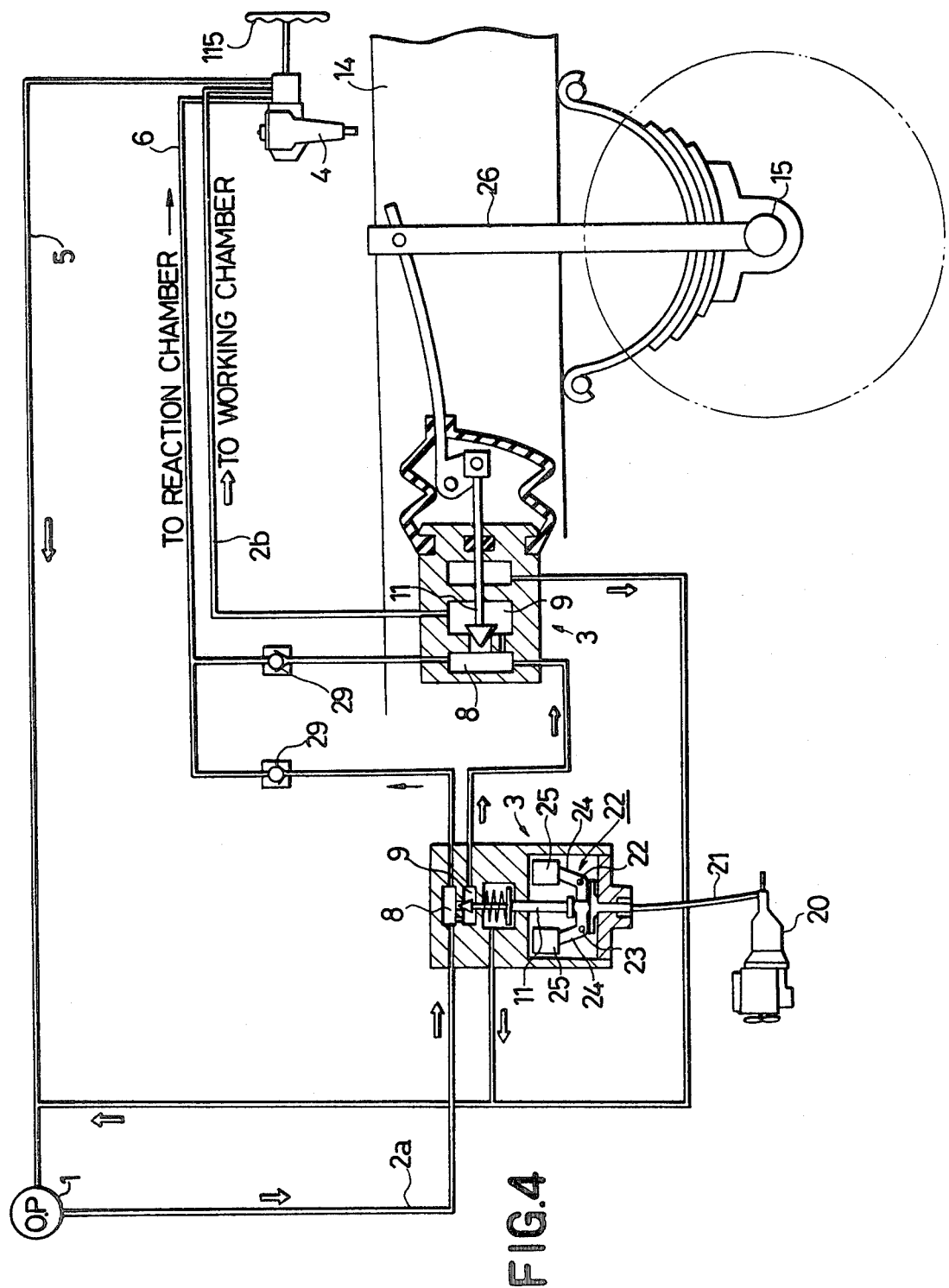
FIG. 4 is a partially cross-sectional connection drawing of another embodiment of the present invention, wherein two pressure control valves are connected in series, one of which valves is controlled by mechanically detecting the weight of the vehicle load and the other valve is controlled by mechanically detecting the vehicle speed.

In the following, another embodiment will be described, in which embodiment the steering power is controlled in response to both the weight of a load and the speed of a vehicle. Such an embodiment is shown in FIG. 4. In this embodiment, two pressure control valves 3 are connected in series and each pressure control valve 3 is provided with a poppet valve 11 which is similar to that of the foregoing embodiment. One pressure control valve 3 is regulated by using a centrifugal governor mechanism as a vehicle speed sensing mechanism and the other pressure control valve is regulated by using a leaf spring as a load weight sensing mechanism.

The above vehicle speed sensing mechanism is composed of a rotary cable 21 which is led from the driving shaft of a transmission 20, and a centrifugal governor mechanism 22 which is driven by the turning of this rotary cable 21. The centrifugal governor mechanism 22 comprises a pair of arms 24 which are pivotally secured by pins 23 and weights 25 which are attached to the tip ends of the respective arms 24. When the centrifugal governor mechanism 22 is rotated by the rotary cable 21 in response to the rotation of the driving shaft of the transmission 20, that is, in response to the speed of a vehicle, the centrifugal governor mechanism 22 urges the poppet valve 11 in the direction to close the valve with the increase of the vehicle speed.

In the vehicle load sensing mechanism, a connecting rod 26 is vertically attached to a wheel axle 15 and one end of a leaf spring 27 is pivotally secured to the upper end of the connecting rod 26. The leaf spring 27 itself is further pivotally fixed to a chassis frame 14 by a pin 28. Further, the other end of the leaf spring 27 is pivotally secured to the poppet valve 11 of the pressure control valve 3. When the chassis frame 14 and the wheel axle 25 approach together by the weight of the load, the leaf spring 27 urges the poppet valve 11 in the direction to open the valve.

In this embodiment, the hydraulic oil delivered from the oil pump 1 is led into the speed sensing pressure control valves 3 and the pressure is regulated in response to the vehicle speed and the hydraulic oil is further led into another load sensing pressure control valve 3. After the hydraulic oil is regulated in response to the weight of the load, it is supplied to the working chamber of the power steering 4. After that the hydraulic oil is returned to the oil pump 1.

When the vehicle speed is minimum and the weight of the vehicle load is maximum, the communicating areas of both the poppet valves 11 are held at maximum and the hydraulic pressure to the reaction force chamber is maintained at a minimum level, meanwhile, the hydraulic pressure to the working chamber is not reduced.

To the contrary, when a vehicle speed is maximum and the weight of a vehicle load is minimum, the communicating areas of both the poppet valves 11 are held at a minimum level. Accordingly, the hydraulic pressure applied to the reaction force chamber is maintained at a maximum value, while the hydraulic pressure to the working chamber is reduced, thereby reducing the ratio of the output of the power steering 4.

When a vehicle speed and the weight of a load are at medium levels, the hydraulic pressures applied to the reaction force chamber and the working chamber are also regulated to medium values. However, when the hydraulic pressure applied to the reaction force chamber is made maximum by one of the pressure control valves, such a pressure is applied as it stands to the reaction force chamber. For this reason, two check valves 29 are installed in order to avoid the leakage of a hydraulic pressure to a pressure control valve on the other side when a maximum pressure to the reaction force chamber is exerted by one pressure control valve.

The types of vehicle load sensing mechanisms and vehicle speed sensing mechanisms are by no means restricted to those shown in FIGS. 1 and 4. In the following, other types of them will be described.

Figure 5:
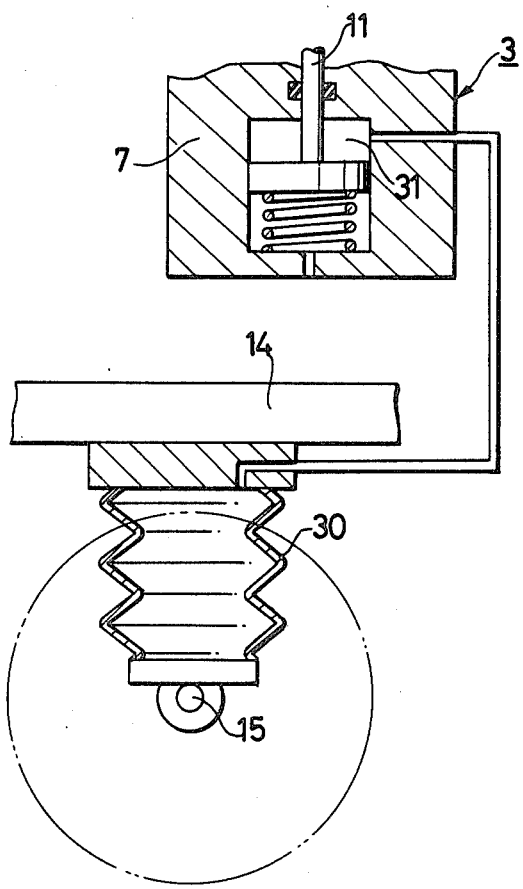
FIG. 5 is a partially cross-sectional connection drawing of another embodiment of a load sensing mechanism.

The vehicle load sensing mechanism that is shown in FIG. 5 is provided with an air cushion 30 in the space between a chassis frame 14 and a wheel axle 15. The pressure in the air cushion 30 is led into a chamber 31 which is defined in the housing 7 of a pressure control valve 3. When the pressure is high, that is, the weight of a vehicle load is large, the poppet valve 11 is shifted in the direction to open the valve.

Figure 6:
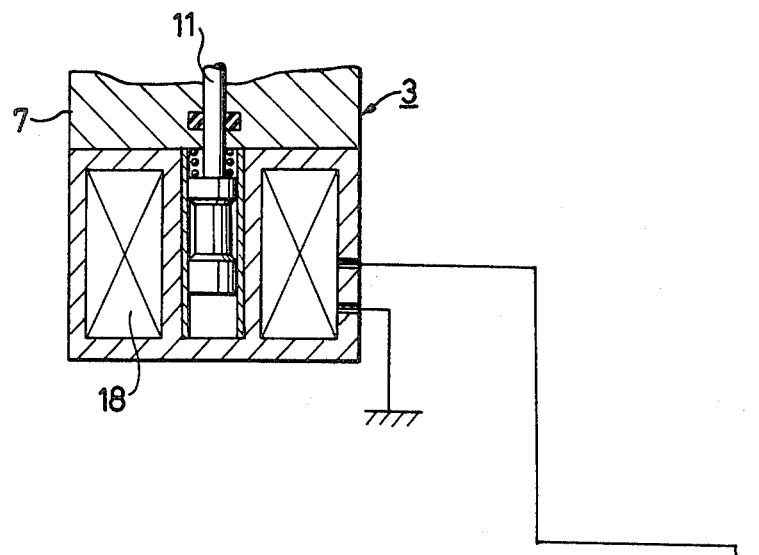
FIG. 6 and FIG. 7 are partially cross-sectional connection drawings of other embodiments of vehicle speed sensing mechanisms, respectively.

In the vehicle speed sensing mechanism as shown in FIG. 6, a vehicle speed sensor 35 is attached in the midway of a rotary cable 34 of a speed meter 33. The cable 34 is geared to the driving shaft of the transmission 32. The electric power supply to a solenoid 18 is controlled by this vehicle speed sensor 35 in response to the rotational frequency of the rotary cable 34, that is, in response to the speed of a vehicle. When a vehicle speed is low, the poppet valve 11 is shifted in the direction to open the valve.

Figure 7:
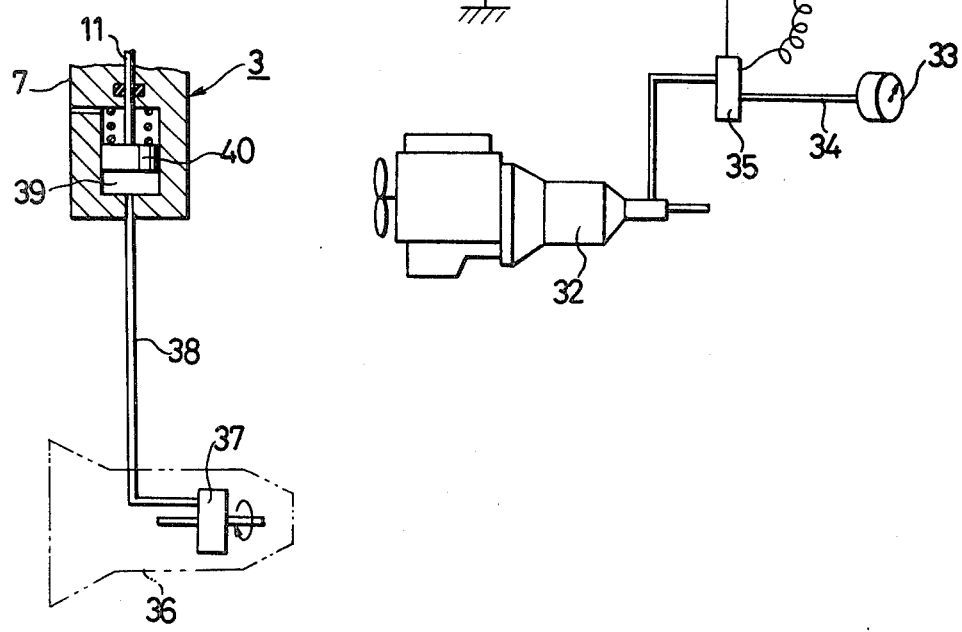

In FIG. 7 is shown another speed sensing mechanism of a hydraulic type. An oil pump 37 formed on the driving shaft of a transmission 36, is communicated by way of a line 38 with a chamber 39 which is defined in the housing 7 of a pressure control valve. A poppet valve 11 is connected to a piston 40 which is held within the chamber 39. When the pressure in the oil pump 37 is raised in response to a vehicle speed, the pressure is led into the chamber 39 by way of the line 38 and the poppet valve 11 is urged by the piston 40 in the direction to close the valve.

It may be clearly understood that the above-described speed sensing mechanisms and load sensing mechanisms of various types perform their own functions which are substantially the same as the mechanisms of the foregoing embodiments.

In the embodiment shown in FIG. 4, two pressure control valves are used. However, in the embodiment shown in FIG. 8, the steering power is controlled by means of a single pressure control valve in response to both vehicle speeds and vehicle loads.

In this embodiment, an electric load sensing mechanism as shown in FIG. 1 and an electric speed sensing mechanism as shown in FIG. 6 are used. A load sensor 12 and a speed sensor 35 of the respective sensing mechanisms are connected to a control circuit 41. Receiving the signals from the speed sensor 35 and the load sensor 12, the control circuit 41 supplies electric currents to a solenoid 18 in resposed to the levels of the vehicle speed and the vehicle load. In this embodiment, the position of a spring 19 is different from that of the embodiment in FIG. 1, that is, the poppet valve 11 is urged by the spring 19 in the direction to open the valve.

In order to obtain always a comfortable drive feeling, the poppet valve 11 is moved to the lowest position when the vehicle speed is minimum and the vehicle load is maximum, while the poppet valve 11 is shifted to the uppermost position when the vehicle speed is maximum and the vehicle load is minimum. In intermediate conditions other than the above extreme states, the poppet valve 11 may be positioned in an intermediate range in response to a vehicle speed and a vehicle load.

In order to satisfy these requirements, the output of the above vehicle speed sensor 35 is made large with the increase of the vehicle speed and the output of the load sensor 12 is made large with the decrease of the vehicle load. The outputs of both the sensors 35 and 12 are added together by the control circuit 41 and electric currents in response to the obtained values are supplied to the solenoid 18. Accordingly, when the vehicle speed is minimum and the vehicle load is maximum, the output of the control circuit becomes minimum and the poppet valve 11 is shifted to the lowermost position by the force of the spring 19. Thus, the communicating area between the chambers 8 and 9 becomes largest and the pressure in the reaction force chamber of the power steering 4 becomes almost zero. To the contrary, when a vehicle speed is maximum and a vehicle load is minimum, the output of the control circuit 41 becomes maximum and the poppet valve 11 closes the passage 10 between the chambers 8 and 9 to the minimum value. In this state, the pressure in the reaction force chamber of the power steering 4 becomes maximum. In the cases other than the above, for example, when a vehicle speed is minimum and a vehicle load is minimum or when a vehicle speed is maximum and a vehicle load is also maximum, the output of the control circuit 41 becomes medium levels between the above maximum and minimum values.

When the influence of the vehicle load on the resistance in the steering operation is compared with that of a vehicle speed, it is generally considered that the influence of the vehicle speed is larger than that of the vehicle load. Therefore, the output of the vehicle speed sensing mechanism is set to a little higher level than the output of the load sensing mechanism, thereby properly controlling the shifting of the poppet valve 11 in response to vehicle speeds and vehicle loads. Thus, the hydraulic pressure applied to the reaction force chamber of the power steering 4 can also be controlled adequately.

Figure 8:
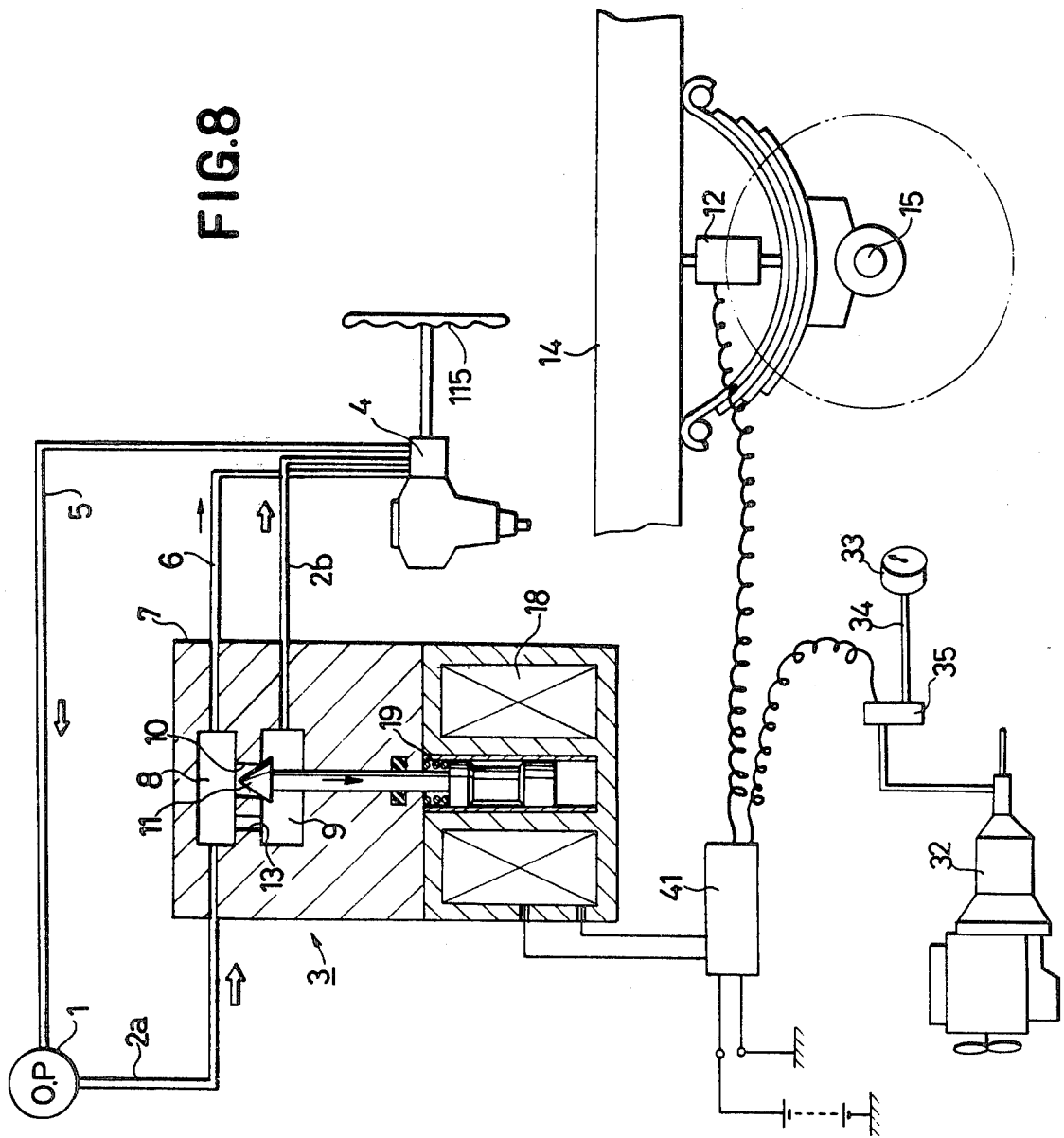
FIG. 8 is a partially cross-sectional connection drawing of another embodiment of the present invention, wherein a pressure control valve is regulated by an electrical load sensing mechanism and a vehicle speed sensing mechanism.
Figure 9:
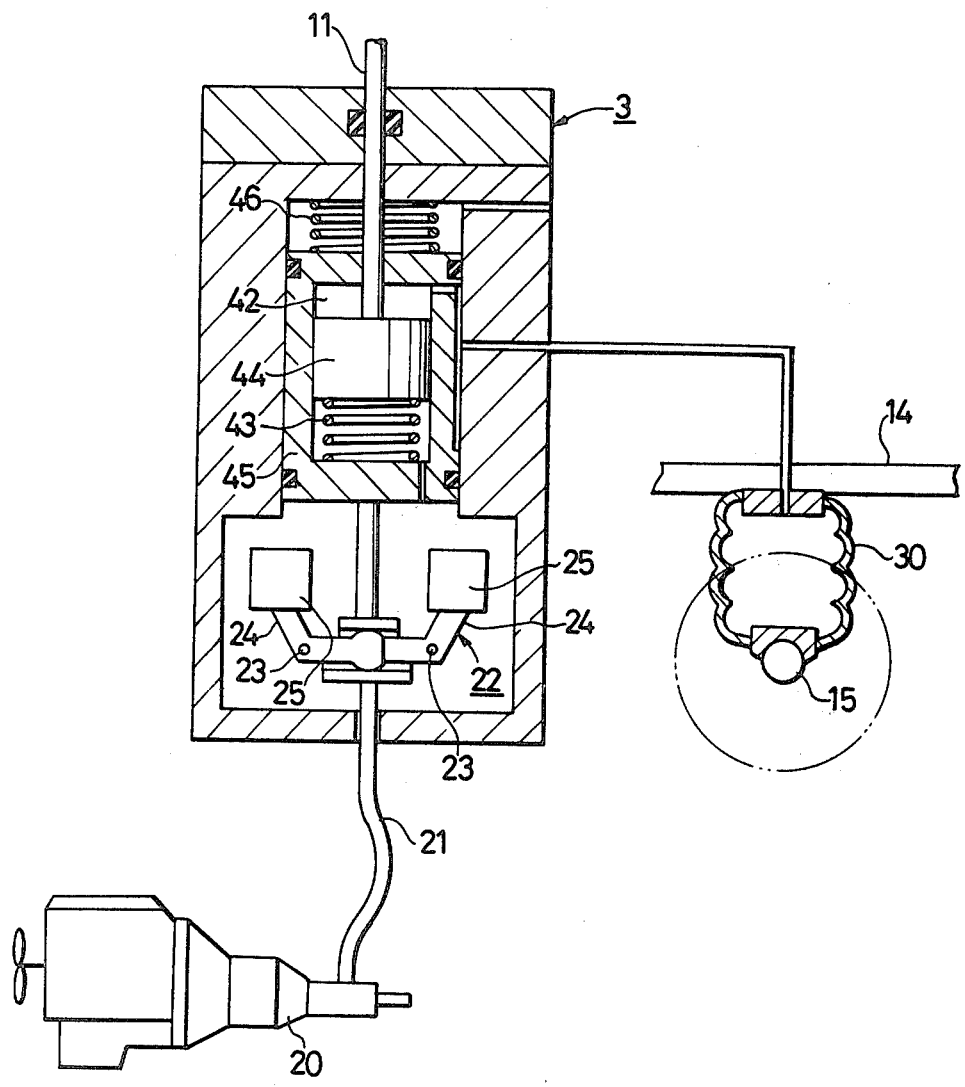
FIG. 9 is a partially cross-sectional connection drawing of a mechanism for use in the regulation of a pressure control valve in response to the weight of a load and a vehicle speed.

In the above-described embodiment shown in FIG. 8, the sensing of vehicle speeds and that of vehicle loads are performed by electrical means and the single pressure control valve is regulated by synthesizing the outputs of both the sensors. However, it is possible to obtain a similar function by combining the foregoing sensing mechanisms of various types. Such example is shown in FIG. 9, in which the centrifugal governor mechanism 22 as shown in FIG. 4 is used as a vehicle speed sensing mechanism and the air cushion 30 as shown in FIG. 5 is combinedly used as a load sensing mechanism.

The output of the load sensing mechanism is led into a chamber 42 as an air pressure and a piston 44 is thus pushed down by the air pressure against the force of a spring 43. The above-mentioned poppet valve 11 is connected to this piston 44. Accordingly, in like manner as the electrical controlling means, the poppet valve 11 is shifted downward with the increase of a vehicle load in this mechanical control. Meanwhile, the output of the vehicle speed sensing mechanism is transmitted to a cylinder 45 having the piston 44, and the output thereof functions as a thrust applied to the centrifugal governor mechanism 22. Thus, the cylinder 45 is moved upward with the increase of vehicle speed against the force of a spring 46. As the result, when the vehicle speed is minimum and the vehicle load is maximum, the poppet valve 11 is moved to the lowest position, while if the vehicle speed is maximum and the vehicle load is minimum, the poppet valve 11 is shifted to the highest position.

Figure 10:
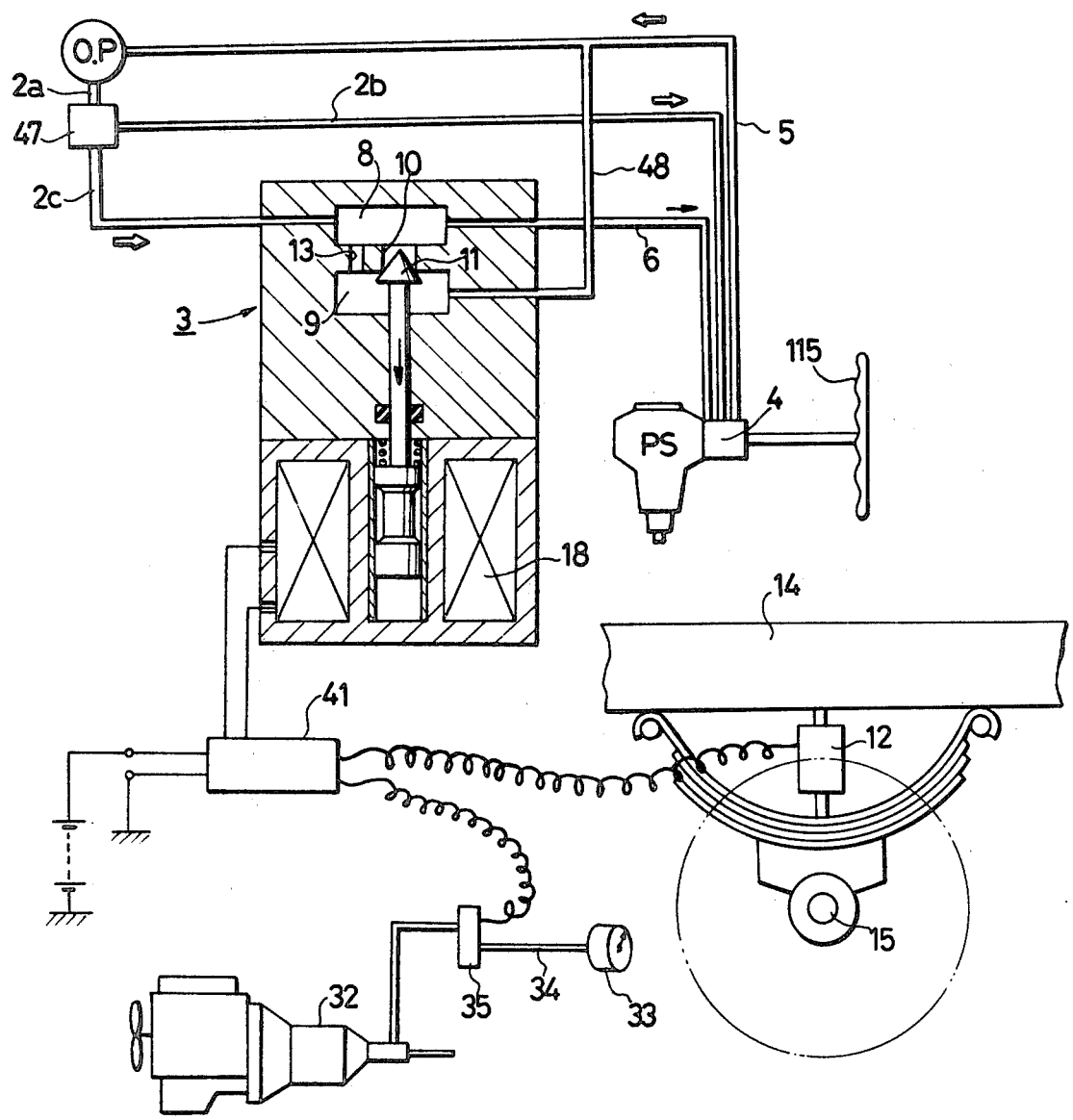
FIG. 10 is a partially cross-sectional connection drawing of another embodiment of the present invention.

In the above-described power steering unit 4, both the pressure of the working chamber and the force of the reaction force chamber exert influences on the reaction force applied to the steering wheel, that is, they are of the third type which has been mentioned in the beginning of this specification. In the next embodiment which is shown in FIG. 10, the reaction force to a steering wheel depends only upon the pressure of a reaction force chamber. In this embodiment, in order to simplify the illustration thereof, the load sensing mechanism and the vehicle speed sensing mechanism for controlling the poppet valve 11 are made the same as those of the embodiment shown in FIG. 8 and the explanation thereon will be omitted.

In this embodiment, a line 2a to deliver the hydraulic oil from an oil pump 1, is divided into a line 2b and the other line 2c by a manifold valve 47 and the line 2b is directly connected to the working chamber of the power steering 4. The line 2c is connected to a chamber 8 of a hydraulic reaction force control valve 3, an orifice 10, a chamber 9, a line 48 and further to the oil pump 1, thereby forming a fluid circuit. The chamber 8 is further communicated with the reaction force chamber of the power steering 4 by way of a line 6.

The manifold valve 47 has a function that the quantity ratio between the hydraulic oil supplied to the working chamber of the power steering 4 through the line 2b and the hydraulic oil supplied to the pressure control valve 3 through the line 2c is maintained at a constant level, and with this function, the manifold valve 47 gives another feature that the change of pressure in one side fluid passage does not affect the pressure in the other fluid passage. Accordingly, in the power steering 4 in which the reaction force to the steering wheel depends only upon the pressure of the reaction force chamber, as shown in FIG. 10, the object can be attained by controlling only the pressure applied to the reaction force chamber in response to vehicle speeds and vehicle loads with using the manifold valve 47.

It should be noted that even though the pressure control valve 3 with a poppet valve 11 is used in each of the above embodiments, pressure control valves of other types may also be used.

In the embodiment shown in FIG. 11, a pressure control valve 52 is provided with a spool valve 51 in place of the poppet valve 11. A load sensing mechanism having a leaf spring 27 as shown in FIG. 4 and a vehicle speed sensing mechanism having a centrifugal governor mechanism 22 are disposed opposite to the above-mentioned spool valve 51. The fluid circuit of this embodiment is basically the same as that of the embodiment shown in FIG. 10. The hydraulic oil that is delivered from an oil pump 1 flows into a manifold valve 47 by way of a line 2a, and by this manifold valve 47, the hydraulic oil is divided into two parts. One part of the hydraulic oil is supplied into the working chamber of the power steering 4 through a line 2b and the oil is further returned into the oil pump 1 by way of a line 5. The other part of the hydraulic oil from the manifold valve 47 is supplied into the pressure control valve 52 through a line 2c and the hydraulic oil is further returned into the oil pump 1 by way of a line 53 and the above line 5. The hydraulic pressure which has been controlled by the pressure control valve 52 in response to a vehicle speed and a vehicle load, is introduced into the reaction force chamber of the power steering 4 by way of a line 6. By this function, a comfortable drive feeling can be obtained irrespective of the conditions of the driving of the vehicle.

The above-mentioned pressure control valve 52 is provided with a spool valve 51 which is slidably fitted in a cavity 55 formed in the housing 54 of the control valve 52. An annular groove 56 is formed around the spool valve 51 and the spool valve 51 is urged left ward (in FIG. 11) in the rest position by a spring 57. In this position, the annular groove 56 fully communicate with both annular grooves 58 and 59 that are defined in the inside wall of the cavity 55. The annular groove 58 on one side is communicated with the line 2c and the other annular groove 59 is communicated with the line 53. Thus the hydraulic oil delivered from the oil pump 1 is circurated and returned into the oil pump 1 by way of the line 2c, the annular grooves 58, 56 and 59 and the line 53. Further, the annular groove 58 is communicated with the line 6, and when the spool valve 51 is shifted right and the overlapping (L) of the annular grooves 58 and 56, that is, the area of fluid passage, is controlled, the hydraulic pressure is raised in response to the degree of the controlling and such a controlled pressure is then introduced into the reaction force chamber of the power steering 4.

As a vehicle speed sensing mechanism which is used for controlling the displacement of the spool valve 51 of the above pressure control valve 52, the mechanism as shown in FIG. 4 is employed in this embodiment. The centrifugal governor mechanism 22 of the vehicle speed sensing mechanism is connected to the left end of the above spool valve 51 by means of a rod 60. The leaf spring 27 of the vehicle load sensing mechanism is connected to the right end of the spool valve 51 by means of a pin 61 and a rod 62.

When a vehicle speed is minimum and a vehicle load is maximum, it is necessary that the hydraulic pressure introduced into the reaction force chamber of the power steering 4 is made minimum because the resistance in steering operation becomes maximum. When the vehicle speed is low, the thrust of the centrifugal governor mechanism 22 to push the spool valve rightward is small, while if the vehicle load is large, the force of the rod 62 to push the spool valve 51 leftward becomes large. As the result, the spool valve 51 is maintained at the position shown in the drawing and the overlapping L of the annular grooves 58 and 56, that is, the area of fluid passage, becomes maximum.

In this state, the hydraulic oil is supplied into the annular groove 58 from the oil pump 1 through the line 2a, the manifold valve 47 and the line 2c, and the oil flows into the annular groove 56 without any throttle action. Accordingly, the pressure rise by throttling is not caused to occur in the annular groove 58.

Therefore, the pressure of the reaction force chamber of the power steering 4 which is communicated with the annular groove 58 through the line 6, is kept at a low level of almost zero. The hydraulic oil that is introduced into the annular groove 56 is then returned into the oil pump 1 by way of another annular groove 59, and the lines 53 and 5.

Meanwhile, since the working chamber of the power steering 4 is supplied with a hydraulic pressure by way of the line 2a, the manifold valve 47 and the line 2b, a pressure is produced in the working chamber when the steering wheel is operated, therefore, an auxiliary force is applied to the vehicle wheels. In this state, even though the resistance in the steering operation is maximum as described above, since the hydraulic pressure in the reaction force chamber is kept minimum, the operation of the steering wheel can be performed quite lightly.

When the vehicle is maximum and the vehicle load is minimum, it is necessary that the hydraulic pressure which is introduced into the reaction force chamber of the power steering 4 is made maximum because the resistance in the operation of a steering wheel becomes minimum. When the vehicle speed is maximum, the thrust produced by the centrifugal governor mechanism 22 becomes maximum and this thrust shifts the spool valve 51 rightward. Thus, the fluid passage between the annular grooves 58 and 56 is narrowed. In addition, when the vehicle load is small, the rod 62 moves the spool valve 51 rightward, so that the above fluid passage between the annular grooves 58 and 56 becomes minimum. Therefore, the pressure in the annular groove 58, that is, the pressure in the reaction force chamber of the power steering 4, becomes maximum.

Accordingly, in the state of high speed and low load conditions with a low steering resistance, a stable and relatively heavy operation of the steering wheel can be realized.

When both the vehicle speed and vehicle load are minimum, or both of them are maximum, or in any other conditions, the steering resistance becomes a medium value between the above extreme cases. When the vehicle speed is low, the force of the rod 60 to shift the spool valve 51 rightward is small, while with a small vehicle load, the rod 62 largely moves the spool valve 51 rightward. In this case, the rod 60 on one side gives a resistance to the rightward movement of the spool valve 51 that is caused by the other rod 62, therefore, the rightward shifting of the spool valve 51 becomes a medium degree.

To the contrary, when the vehicle speed is high, the rod 60 largely moves the spool valve 51 rightward, however, with a large vehicle load, the rod 62 pushes the spool valve 51 leftward, as the result, the rightward shifting of the spool valve 51 also becomes a medium level.

As will be understood by the above description, the reaction force chamber of the power steering 4 is supplied with a hydraulic pressure which is controlled in response to a vehicle speed and a vehicle load, so that a comfortable drive feeling can always be obtained irrespective of vehicle speeds and vehicle loads.

Figure 12A:
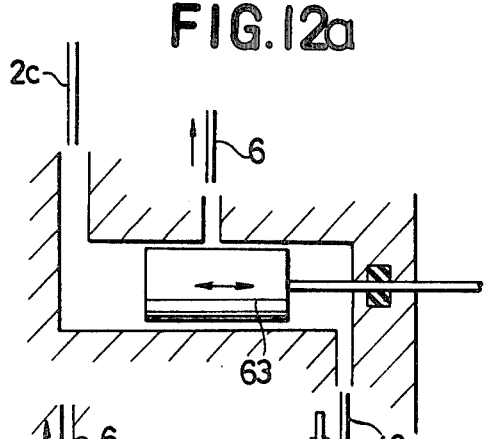
FIG. 12, (a), (b) and (c) are schematic cross-sectional views of the main portions of different pressure control valves, respectively.
Figure 12B:
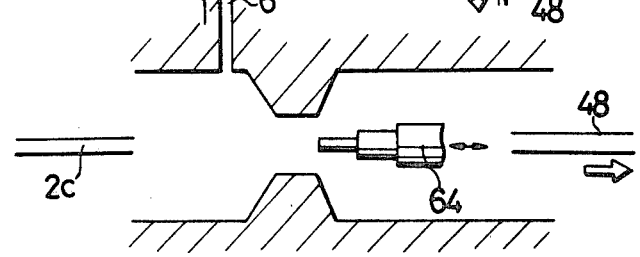
Figure 12C:
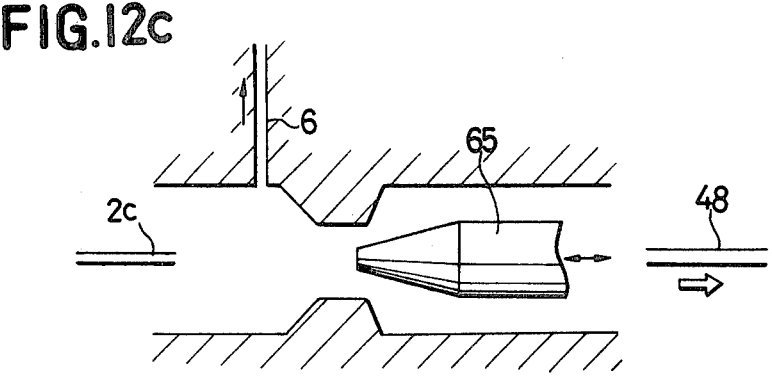

In order to vary the pressure applied to the reaction force chamber of the power steering 4, pressure control valves having various kinds of variable throttling mechanisms can be used. FIG. 12 (a), (b) and (c) show some examples of such mechanisms, in which the lines 2c, 48 and 6 are the same as the lines 2c, 48 and 6 of FIG. 10, respectively. It will be clearly understood that, in these examples, when the valve bodies 63, 64 and 65 are moved in response to vehicle loads and vehicle speeds, the effects similar to that of the embodiment shown in FIG. 10 may be obtained. Further, it is apparent that these pressure control valves can also be used for fluid circuits which have no manifold valve.

Figure 13:
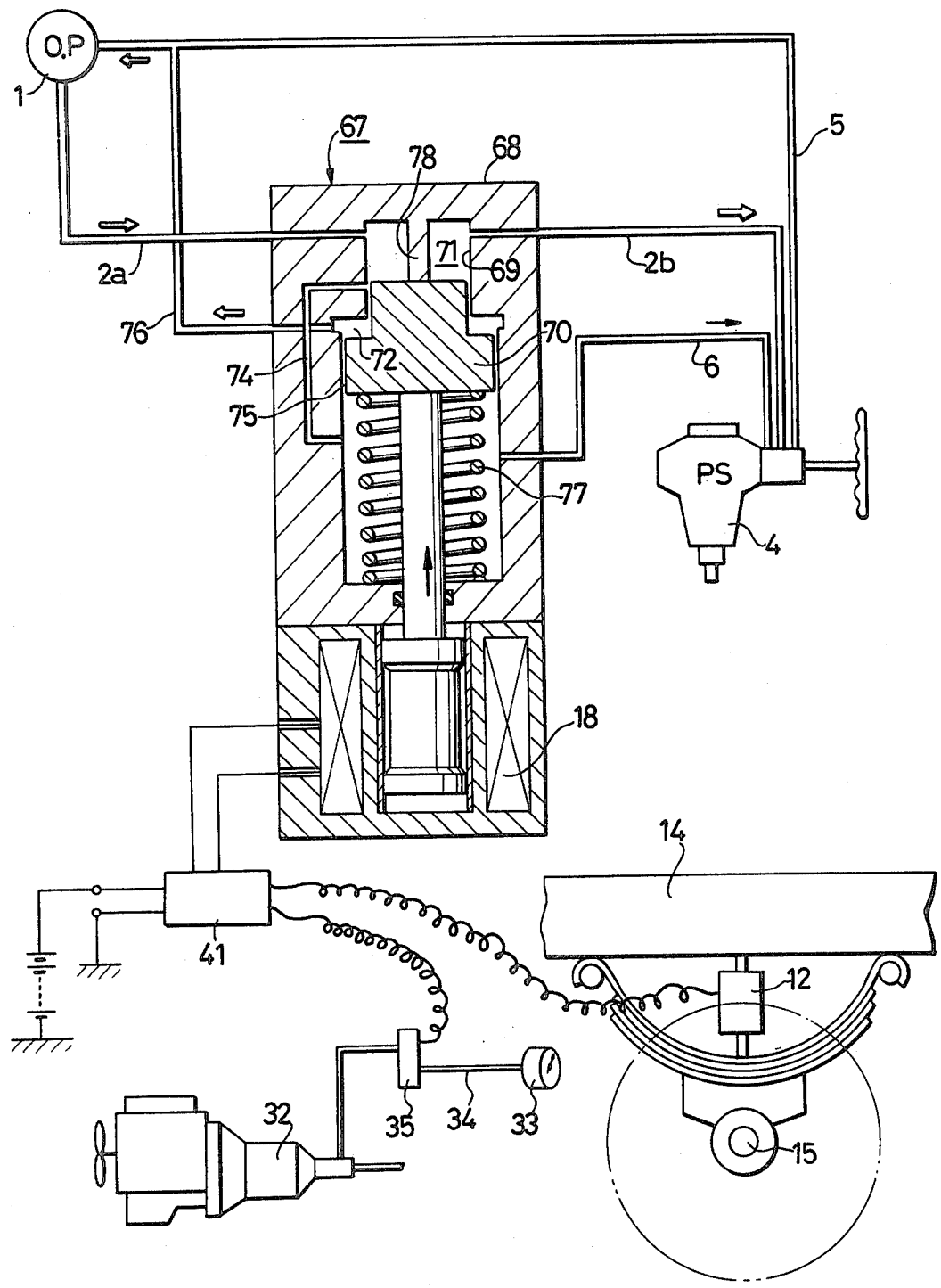
FIG. 13 is a partially cross-sectional connection drawing of another embodiment of the present invention employing a pressure control valve having a still different structure.

FIG. 13 shows another embodiment in which a pressure control valve that is different from the above-described variable throttle type is used. In the housing 68 of this pressure control valve 67, a stepped bore 69 is formed. A stepped piston 70 is slidably fitted into this stepped bore 69, thereby forming three chambers 71, 72 and 73. The chamber 71 above the end face of small diameter portion of the stepped piston 70 is communicated with lines 2a and 2b, thus, the hydraulic oil from the oil pump 1 is supplied into the working chamber of the power steering 4 by way of the chamber 71. The chamber 73 that is formed under the end face of the large diameter portion of the stepped piston 70, is communicated with the above chamber 71 by way of an inner passage 74 that is defined in the housing 68. Further, this chamber 73 is communicated with the reaction force chamber of the power steering 4 by way of a line 6. Furthermore, the chamber 73 is communicated with the chamber 72 through a narrow relief clearance 75 which is formed between the stepped piston 70 and the stepped bore 69. The latter chamber 72 is further communicated with the oil pump 1 by way of a line 76.

A spring 77 urges the stepped piston 70 upward and, in the rest position, the stepped piston 70 is pushed into contact with a stopper 78 which is formed in the chamber 71. In this state, the outer surface of the stepped piston 70 closes the opening of the passage 74 on the side of the chamber 71, thus the communication between the chambers 71 and 73 is shut off.

In the above structure, the hydraulic oil which is supplied from the oil pump 1 is fed into the working chamber of the power steering 4 by way of the line 2a, the chamber 71 of the pressure control valve 67 and the line 2b, and the hydraulic oil is further returned into the oil pump 1 by way of the line 5. When a steering wheel is turned in this condition, the hydraulic pressure in the line 2b and the chamber 71 on the upstream side of the power steering 4 is raised and this pressure pushes down the stepped piston 70 against the force of the spring 77. Thus, the inner passage 74 is opened to communicate the chambers 71 and 73 with each other, and the above raised pressure is introduced into the chamber 73. When the pressure in the chamber 73 is raised, this pressure as well as the force of the spring 77 push up the stepped piston 70, by which function, the inner passage 74 is closed again. Therefore, when the resultant force of the push of the spring 77, the urging force of the solenoid 18 and the pressure in the chamber 73 exceeds the above-mentioned raised pressure, the inner passage 74 is closed. This chamber 73 is communicated with the reservoir side of the oil pump 1 by way of the relief clearance 75, the chamber 72 and the line 76. Since the clearance 75 functions like an orifice passage, the pressure of the chamber 73 becomes gradually low. However, when the pressure in the chamber 73 is lowered, the inner passage 74 is opened and the pressure is introduced again, therefore, the pressure in the chamber 73 is maintained at an almost constant level. Since the pressure in this chamber 73 is introduced into the reaction force chamber of the power steering 4 by way of the line 6, a driver is able to have a steering feeling in response to the raised pressure, that is, in response to the steering resistance.

Figure 14:
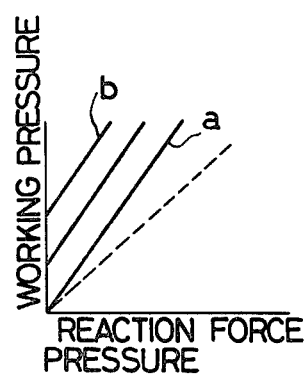
FIG. 14 is a diagram showing the characteristic curves that are obtained by the power steering control device shown in FIG. 13.

When the vehicle load is small and the vehicle speed is high, the force of the solenoid 18 to push up the stepped piston 70 is small, so that as shown by the straight line (a) in FIG. 14, the pressure in the chamber 73, that is, the pressure in the reaction chamber is promptly raised with the rise of the pressure in the chamber 71, that is, the pressure rise of the working chamber. Therefore, even when the vehicle is in a high speed and light load or non-load condition, a reliable steering feeling can be obtained.

Meanwhile, when a vehicle speed is low and a vehicle load is large, the force applied to the stepped piston 70 becomes large, therefore, as shown by the straight line (b) of FIG. 14, the pressure rise in the reaction force chamber is made lower as compared with the above case. As the result, a light steering feeling can be experienced at the low speed and large load running.

Further, in the above-described pressure control valves 3 and 52 of a variable orifice type, when the viscosity of oil is varied owing to the change of temperature, the pressure produced by an orifice is also varied. When the setting is carried out so as to obtain a most suitable steering power at the normal oil temperature after worm-up, the steering feeling in the beginning stage of low oil temperatures is not good. Further, the loss of energy cannot be avoided owing to the flow of a small quantity of oil. In the present invention, however, the pressure which is introduced into the reaction force chamber is the pressure which is necessary to balance the stepped piston 70, therefore, even when the viscosity of oil is varied, the pressure which is introduced into the reaction force chamber is not changed. Further, as compared with the pressure control valve of the variable orifice type in which oil must be always supplied to the orifice, the pressure control valve of the invention is free from the loss of oil.

Figure 15:
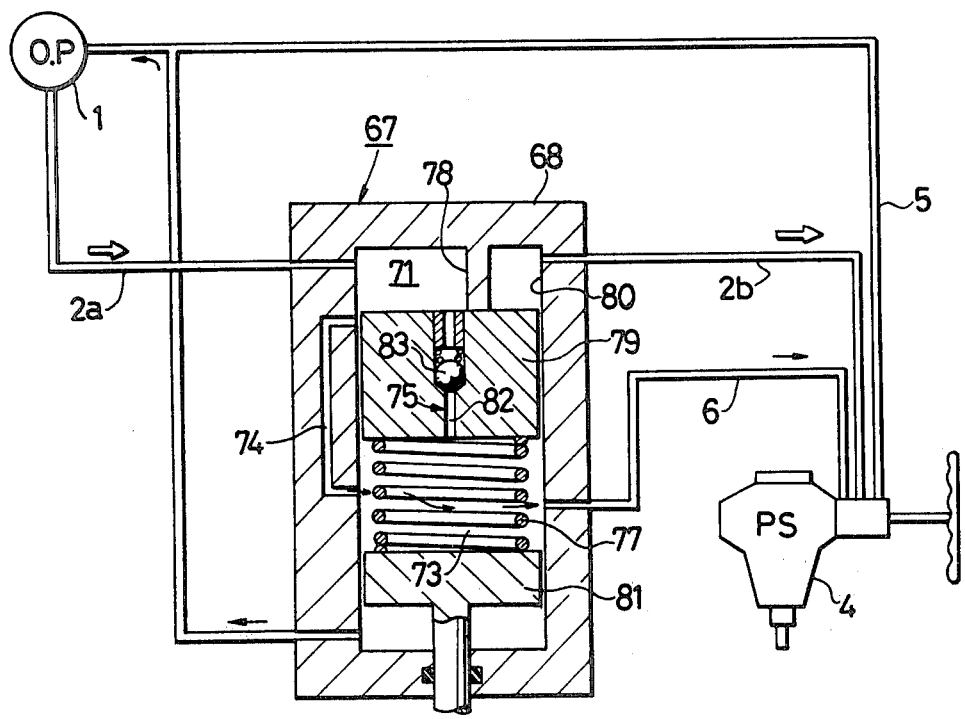
FIG. 15 is a partially cross-sectional connection drawing of another embodiment of the present invention employing a pressure control valve, a part of which valve is different from that of FIG. 13.
Figure 16:
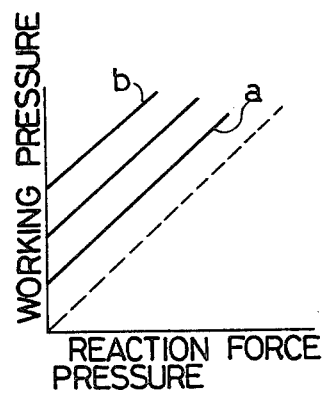
FIG. 16 is a diagram showing the characteristic curves that are obtained by the power steering control device shown in FIG. 15.
Figure 17:
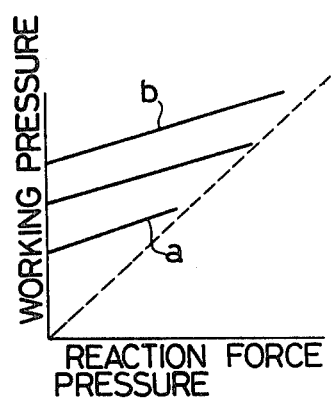
FIG. 17 is a diagram also showing the characteristic curves that are obtained by a power steering control device (not shown in drawings) which is similar to those of FIGS. 13 and 15.

In FIG. 15 is shown another embodiment of a pressure control valve 67 which is a modification of the embodiment in FIG. 13. In this embodiment, a different piston 79 is used in place of the above-mentioned stepped piston 70. The diameters of both end faces of this piston 79 are the same. When this piston 79 is used, the relation between the pressure of the working chamber of the power steering 4 and the pressure of the reaction force chamber of the power steering 4 becomes the state as shown in FIG. 16. When the pressure receiving area of the piston on the side of the chamber 73 is made smaller than the pressure receiving area on the side of the chamber 71, the relation between the pressure of the working chamber and that of the reaction force chamber becomes the state as shown in FIG. 17. By the way, the reference symbols (a) and (b) in FIGS. 16 and 17 correspond to the symbols (a) and (b) in FIG. 14.

In this embodiment, a spring seat 81 is slidably fitted into the bore 80 of the housing 68 and a spring 77 is disposed between the piston 79 and the spring seat 81. The load sensing mechanism and speed sensing mechanism are connected to the above spring seat 81.

Further, in this embodiment, the relief passage 75 which allows oil to escape is composed of an inner passage 82 which is formed in the piston so as to communicate the chamber 71 with the other chamber 73 and a one-way check valve 83 which is formed in the inner passage to allow the passage of the oil from the chamber 73 into the chamber 71.

Figure 18:
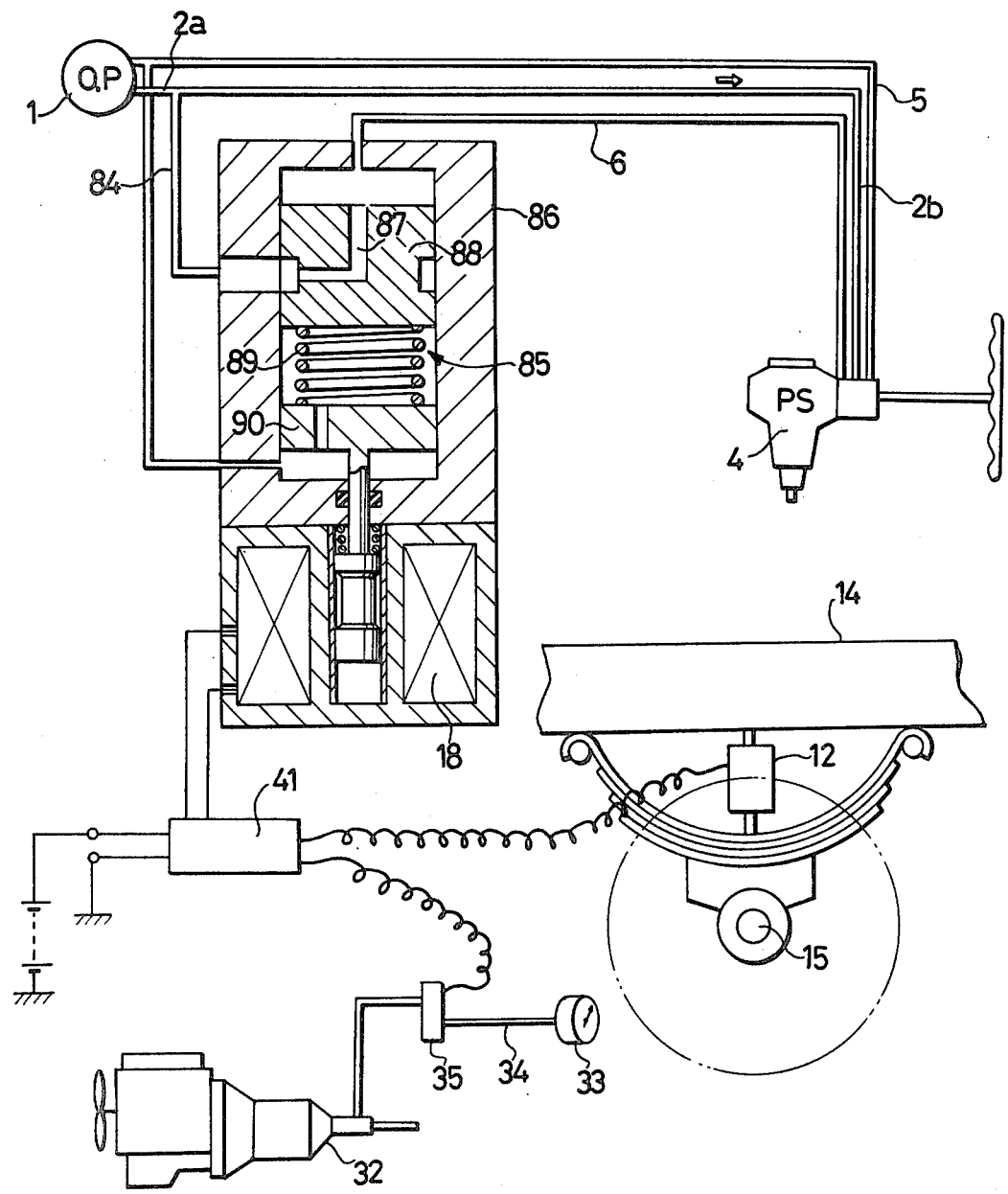
FIG. 18 is a partially cross-sectional connection drawing of another embodiment of the present invention, wherein a limit action mechanism is used as a pressure control valve.

The embodiment shown in FIG. 18 is provided with a limit action mechanism 85 as a pressure control valve which varies the upper limit of the reaction force applied to the steering wheel 4 in response to vehicle speed and vehicle load. The mechanism 85 is installed between the lines 84 and 6 that are connected to the reaction force chamber of the power steering 4. The valve box 86 of this mechanism 85 is provided with a slidable valve body 88 which has a communication passage 87 to regulate the communication between the lines 84 and 6. A spring 89 pushes the valve body 88 and the set force of this spring 89 is controlled in response to vehicle speed and vehicle load. The spring seat 90 of the spring 89 is connected to a solenoid 18. Accordingly, when the vehicle load is small and the vehicle speed is high, the spring seat 90 is shifted downward (in the drawing) so that the set force of the spring 89 against the valve body 88 becomes small. Thus, when the pressure of the working chamber is raised by the operation of the steering wheel and the pressure give an influence on the reaction force chamber, the valve body 88 is moved down by such a pressure and it closes the line 84. After that, the pressure introduced into the reaction chamber of the power steering becomes constant, in which the value of the pressure is determined in response to vehicle speed and vehicle load.

The above description is applied to the power steering which has a reaction force chamber, however, in a power steering having no reaction force chamber, the controlled hydraulic pressure from the pressure control valve may be introduced into the working chamber of the power steering. In such a case, it is of course unnecessary to provide the line which connects the pressure control valve and the reaction force chamber of the power steering.

Figure 19:
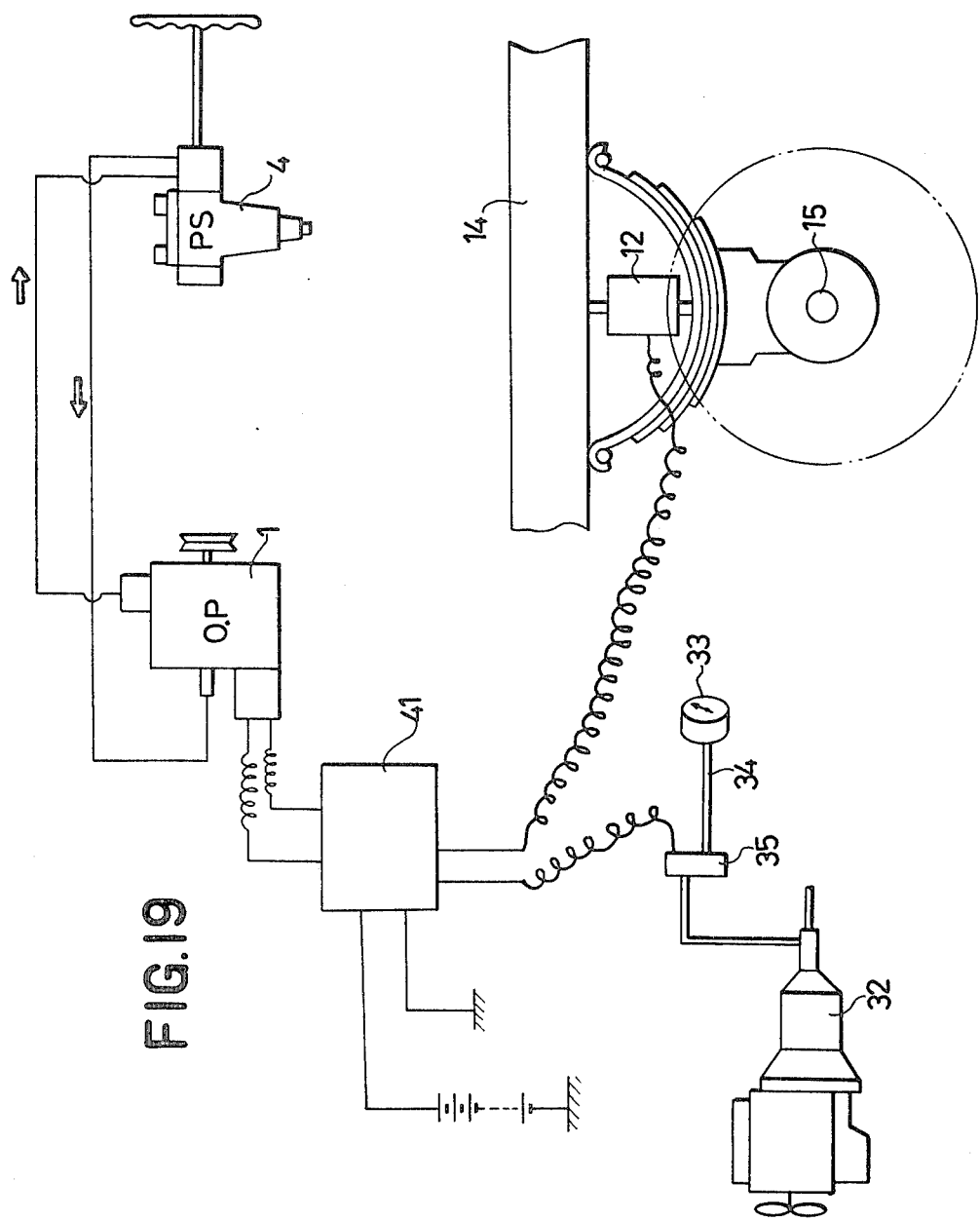
FIG. 19 is a connection drawing of still another embodiment of the present invention, wherein the relief valve of an oil pump is used as a pressure control valve.

When a reaction force chamber is not provided, or even when a reaction force chamber is provided, if the line to the reaction force chamber and the line to the working chamber is divided by a manifold valve, a relief valve as pressure control valve may be installed in the midway of the line to the working chamber or to the reaction force chamber. In the embodiment shown in FIG. 19, the present invention is applied to a power steering which has no reaction force chamber. The relief pressure of an oil pump 1 is controlled in response to the output of a control circuit 41. Of course, the relief pressure of the oil pump 1 is made higher when the vehicle load is large and the vehicle speed is low, so that the hydraulic pressure applied to the working chamber of the power steering 4 becomes high to increase the steering output and the resitance in the operation of the steering wheel becomes low. The controlling of the relief pressure can be done, for example, as follows. In an ordinary oil pump, the setting and regulating of the relief pressure is performed by changing the force of a spring which pushes a valve body toward a valve seat. Accordingly, the spring seat of the spring to push the valve body is made movable and the position of this spring seat is controlled by means of a solenoid. The electrical control of the solenoid is performed by the output of the above-mentioned control circuit 41 so as to raise the relief pressure when a vehicle load is large and a vehicle speed is low.

In the above-described embodiments except the one shown in FIG. 1, the controlling of pressure control valves are performed in response to both vehicle loads and vehicle speeds. It should be, however, noted that, when the controlling in response to vehicle speeds is not necessary, the vehicle speed sensing mechanism can be omitted also in these embodiments.

Further, in the above-described embodiments, the vehicle wheel to be attached with the vehicle load sensor is not restricted. Accordingly, the sensing of vehicle loads may be attained by any of front wheels and rear wheels. However, it is preferable in view of the object of the present invention that the vehicle loads are detected by means of a vehicle wheel for steering, that is, generally a front wheel. It is possible that a vehicle load is detected only one time, for example, when the engine is started without performing continuous sensing and the regulating of the power steering is carried out with such a detected value. In such a case, the vehicle load sensor is not directly connected to the fluid pressure control means and, by reading the value, the fluid pressure control means may be regulated manually so as to control the power steering with the vehicle load. When a continuous type load sensor is used, the afore-mentioned filter to eliminate high frequency components is used. When a filter is not used, vehicle loads can be detected by using a load sensing means of lower sensitivity or lower responding character, or by using a buffer to eliminate the shocks of loads.

Further, the power steerings are classified according to their substantial structures into those using spool valves, those using rotary valves and those using flapper valves. However, the present invention may be applied to any type of these power steerings. By the way, in the above-described embodiments, the pressure control valves are separately formed from the oil pumps 1 and power steerings 4 for the convenience of illustration. However, it is to be noted that the pressure control valves can be previously mounted in the bodies of power steerings 4 or oil pumps 1.

Lastly, it should be emphasized that the above specific examples are intended as merely illustrative and in no way restrictive of the invention. It is preferred, therefore, that the present invention be limited not by the specific disclosure therein, but only by the appended claims.

What is claimed is:

1. A power steering control system for controlling operation of a fluid pressure-operated power steering unit of a steerable vehicle having a steering wheel, said power steering unit including fluid pressure-operated reaction means for applying a reaction force to resist turning of said steering wheel, which comprises:

a pump for supplying pressurized fluid for operating said reaction means;

a vehicle load sensing mechanism which produces an output responsive to the weight of the load on the vehicle;

fluid pressure control valve means connected for controlling the pressure of the pressurized fluid applied by said pump to said reaction means and thereby controlling the amount of reaction force applied to said steering wheel, and actuating means connected for operating said control valve means in response to the output of said vehicle load sensing mechanism so that the reaction force applied to the steering wheel is small when the weight of the load on the vehicle is large.

2. A power steering control system as claimed in claim 1, in which said fluid pressure control valve means is connected between said pump and said reaction means.

3. The power steering control system as claimed in claim 2, wherein said power steering unit has a working chamber which produces a steering output and said reaction means of said power steering unit is a reaction force chamber which exerts a reaction force on said steering wheel, said pump being connected for supplying pressurized fluid to said working chamber as well as to said reaction force chamber, the pressure of fluid which is introduced into said reaction force chamber being made low by actuation of said fluid pressure control valve means when the weight of the load on the vehicle is large.

4. The power steering control system as claimed in claim 1, wherein said power steering unit has a working chamber which produces a steering output and the reaction force applied to the steering wheel is determined by the level of said steering output and the pressure of the fluid introduced into said working chamber is made high when the weight of the load on the vehicle is large by controlling said fluid pressure control valve means.

5. The power steering control system as claimed in claim 3, including a manifold valve between said pump and said fluid pressure control valve means, a first conduit extending from said manifold valve to said working chamber of said power steering unit and a second conduit extending from said manifold valve to said fluid pressure control valve means.

6. The power steering control system as claimed in claim 2 or claim 3, wherein said vehicle load sensing mechanism is an electric sensor which produces an electrical output in response to variation of the distance between the vehicle wheel axle and the vehicle chassis frame, and said actuating means is a solenoid which receives said electrical output and actuates said fluid pressure control valve means.

7. The power steering control system as claimed in claim 2 or claim 3, wherein said vehicle load sensing mechanism is a pressure sensor which produces a pressure variation in response to variation of the distance between the vehicle wheel axle and the vehicle chassis frame, and said actuating means is fluid pressure operated means for actuating said fluid pressure control valve means.

8. The power steering control system as claimed in claim 2 or claim 3, wherein said vehicle load sensing mechanism is a mechanical sensor connected to a spring for bending said spring in response to variation of the distance between the vehicle wheel axle and the vehicle chassis frame, and said actuating means is mechanical means for actuating said fluid pressure control valve means in response to bending of said spring.

9. The power steering control system as claimed in claim 1, wherein said vehicle load sensing mechanism is connected for detecting the load which is applied to the axle of the steerable wheels.

10. The power steering control system as claimed in claim 6, including a filter connected between said sensor and said actuating means so that the output of said sensor is transmitted to said actuating means by way of said filter which eliminates high frequency components that are caused to occur when a vehicle runs on a curved road or on a rugged road.

11. The power steering control system as claimed in claim 2 or claim 3, wherein said fluid pressure control valve means is composed of a throttle mechanism which throttles the flow of pressurized fluid from said pump to said power steering unit.

12. The power steering control system as claimed in claim 3 or claim 4, wherein said fluid pressure control valve means comprises a housing having a bore, a piston slidably fitted in said bore, means defining chambers on both sides of said piston, said pump being connected with said working chamber of said power steering unit through one of said chambers, the other chamber being connected with said reaction force chamber of said power steering unit, said chambers being connected with each other by a passage which is closed when said piston moves to a rest position on the side of said one chamber which is connected to both said pump and said working chamber, said piston being connected for being moved by said actuating means, and a relief passage for allowing the pressure fluid in said other chamber to escape.

13. The power steering control system as claimed in claim 1 or claim 3, wherein said fluid pressure control valve means comprises a limit action mechanism which defines the upper limit of the pressure that is introduced into said reaction means of said power steering unit.

14. A power steering control system for controlling operation of a fluid pressure-operated power steering unit of a steerable vehicle having a steering wheel, said power steering unit including fluid pressure-operated reaction means for applying a reaction force to resist turning of said steering wheel, which comprises:
a pump for supplying pressurized fluid for operating said reaction means;
a vehicle load sensing mechanism which produces an output responsive to the weight of the load on the vehicle;
a vehicle speed sensing mechanism which produces an output responsive to the speed of the vehicle;
fluid pressure control valve means connected for controlling the pressure of the pressurized fluid applied by said pump to said reaction means and thereby controlling the amount of reaction force applied to said steering wheel, and actuating means connected for operating said control valve means in response to said output of said vehicle load sensing mechanism and the output of said vehicle speed sensing mechanism so that the reaction force applied to the steering wheel is small when the weight of the load on the vehicle is large and the vehicle speed is low.

15. The power steering control system as claimed in claim 14, wherein said vehicle speed sensing mechanism is an electric sensor which produces an electrical output in response to vehicle speed and said actuating means for said fluid pressure control valve means is a solenoid which receives said electrical output.

16. The power steering control system as claimed in claim 14, wherein said vehicle speed sensing mechanism is a centrifugal governor mechanism which is connected to said actuating means for said fluid pressure control valve means.

17. The power steering control system as claimed in claim 14, wherein said vehicle speed sensing mechanism comprises an oil pump installed on the output shaft of the vehicle transmission, and said actuating means of said fluid pressure control valve means is controlled by the delivery pressure of said oil pump.

18. The power steering control system as claimed in claim 14, wherein said vehicle load sensing means and vehicle speed sensing means are respectively composed of electrical sensing means, and said actuating means of said fluid pressure control valve means is controlled by the combined outputs of both of said sensors.

19. The power steering control system as claimed in claim 14, wherein said vehicle load sensing means and vehicle speed sensing means are respectively composed of pressure or mechanical sensors and the outputs of both the sensors are applied simultaneously to said actuating means of said fluid pressure control valve means.

* * * * *